United States Patent [19]

Uehara et al.

[11] Patent Number: 4,847,709
[45] Date of Patent: Jul. 11, 1989

[54] REPRODUCING APPARATUS

[75] Inventors: Tsukasa Uehara; Tsuguhide Sakata, both of Tokyo, Japan

[73] Assignee: Canon Kabushiki Kaisha, Tokyo, Japan

[21] Appl. No.: 925,517

[22] Filed: Oct. 28, 1986

Related U.S. Application Data

[63] Continuation of Ser. No. 543,093, Oct. 18, 1983, abandoned.

[30] Foreign Application Priority Data

Oct. 20, 1982 [JP] Japan .................. 57-183865

[51] Int. Cl.⁴ .................. G11B 17/00; H04N 5/78
[52] U.S. Cl. .................. 360/72.2; 360/10.2; 358/336; 369/32
[58] Field of Search ........ 360/10, 2, 77, 38.1, 360/72.2, 75, 78; 358/336, 907; 369/32, 30, 44

[56] References Cited

U.S. PATENT DOCUMENTS

| | | | |
|---|---|---|---|
| 3,947,873 | 3/1976 | Buchan | 360/38.1 |
| 4,138,663 | 2/1979 | Lehureau | 369/44 |
| 4,290,081 | 9/1981 | Foerster | 360/74.4 |
| 4,371,960 | 2/1983 | Kroiss | 360/77 |
| 4,418,364 | 11/1983 | Wine | 358/335 |
| 4,418,366 | 11/1983 | Moriya | 360/38.1 |
| 4,418,406 | 11/1983 | Ogawa | 369/124 |
| 4,485,412 | 11/1984 | Sugiyama | 358/342 |
| 4,578,718 | 3/1986 | Parker | 360/27 |

Primary Examiner—Aristotelis M. Psitos
Attorney, Agent, or Firm—Robin, Blecker & Daley

[57] ABSTRACT

In the disclosed reproducing apparatus a detector detects that a reproducing head is properly positioned relative to selected one of recording tracks on the recording medium and a control responsive to the detecting means enables an output arrangement to put out an information signal reproduced by the head when the detector detects that the head is properly positioned relative to the selected track. This allows a display device to display the reproduced information when the head is properly positioned relative to the selected track.

15 Claims, 2 Drawing Sheets

REPRODUCING APPARATUS

This is a continuation of application Ser. No. 543,093, filed, now abandoned Oct. 18, 1983.

BACKGROUND OF THE INVENTION

1. Field of the Invention

This invention relates to a reproducing apparatus and more particularly to a reproducing apparatus of the kind arranged to individually reproduce information recorded in discretely arranged recording tracks on a rotary or other recording medium.

2. Description of the Prior Art

In a reproducing apparatus of the kind arranged to individually reproduce picture signals recorded discretely on a rotary recording medium such as a rotating dic or rotating drum, the quality of a reproduced picture is degraded by a discrepancy between the recording track and the tracking position of a reproducing head. This discrepancy is called track deviation. It can occur where the reproducing head is moved from one recording track to another desired recording track or when reproducing a picture signal recorded by a recording apparatus other than the reproducing apparatus.

To prevent this inconvenience, a proposal has been made for an automatic tracking correction device. In this device, a reproducing head is carried by a bimorph electric-to-mechanical converting element; and error signal corresponding to the positional deviation of the reproducing head from the recording track on the recording medium is obtained from the output of the reproducing head; a control signal is produced; and the above-stated track deviation is corrected by applying this control signal to the electric-to-mechanical converting element.

However, even this automatic tracking correction device has been unable to avoid disturbing a picture being reproduced during the period required for the automatic tracking correction or during a shift of the head. Such a picture disturbance is disagreeable to the observer of the reproduced picture.

SUMMARY OF THE INVENTION

It is therefore a general object of this invention to provide a reproducing apparatus which is capable of eliminating the above-stated inconvenience of the apparatuses of the prior art.

It is a more specific object of the invention to provide a reproducing apparatus in which the inconveniences of the prior art apparatuses are eliminated by such an arrangement where a reproduced signal is displayed only when reproducing head means is correctly positioned relative to a recording track selected from recording tracks on a recording medium. In this instance, the apparatus according to the aspect of the invention is arranged such that no signal will be produced before the reproducing head means is correctly positioned for a recording track selected out of a plurality of recording tracks on the recording medium. This arrangement is advantageous in that the observer of the reproduced picture will be saved from having some disagreeable feeling due to pictures that would otherwise be reproduced. Also, the apparatus may be arranged to produce some specific information until the reproducing means is correctly positioned relative to the selected recording track of the recording medium in such a way as to prevent the observer's interest from being lost before reproduction of a picture signal recorded in the selected track.

It is a further object of the invention to provide a reproducing apparatus which eliminates the inconveniences of the prior art apparatuses by producing a reproduced signal when a reproducing head means is correctly positioned relative to a selected recording track by automatic tracking means.

According to an aspect or preferred embodiemnts of the invention, a reproducing apparatus for reproducing information signals from recording tracks of an information signal recording medium comprises head means positionable for reproducing an information signal from selected one of the recording tracks of said recording medium, output means for putting out the information signal reproduced through said head means, detecting means producing a characteristic indication when detecting that the head means is positioned relative to said selected track, and control means for enabling said output means to put out the information signal reproduced through said head means in response to said characteristic indication produced by said detecting means.

According to the preferred embodiments of the invention, said detecting means includes circuit means for detecting, on the basis of the information signal reproduced through said head means, whether the head means is properly positioned relative to said selected track.

According to a preferred embodiment of the invention, said control means is arranged to inhibit said output means from putting out any signal until said circuit means produces said characteristic indication.

According to another preferred embodiment of the invention, the reproducing apparatus further comprises signal producing means for producing a substitutive information signal, and said control means is arranged to cause said output means to put out said substitutive information signal produced by said signal producing means until said circuit means produces said characteristic indication.

The reproducing apparatus may include display means for performing a visual display of an information in response to an output of said output means.

The foregoing and other objects and features of this invention will become clear from the following description of embodiments thereof considered together with the accompanying drawings.

DETAILED DESCRIPTION OF THE PREFERRED EMBODIMENTS

Figure 1:
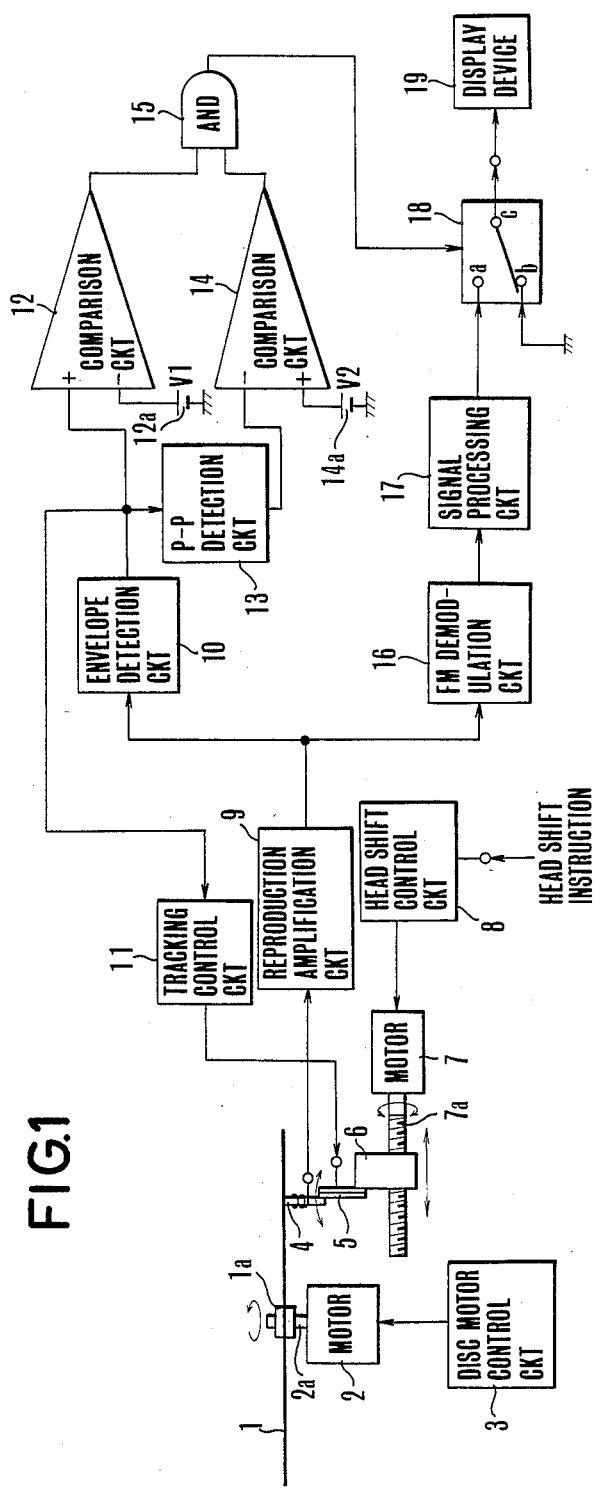
FIG. 1 is a block diagram showing a first embodiment example of the invention.

FIG. 1 shows the arrangement of a reproducing apparatus as a first embodiment of the present invention. In this embodiment, the input terminal of a display device is grounded to have no signal supplied to the display device unitl a reproducing head is correctly positioned relative to a recording track selected out of a plurality of recording tracks on a recording medium. the illustration of FIG. 1 includes a rotary magnetic recording disc 1 which serves as a rotary type recording medium with a center core 1a disposed in its central portion; a disc rotating motor 2 which is arranged to drive the disc 1 in the direction of arrow with the center core 1a of the disc 1 attached to the rotating shaft 2a of the motor 2 at a coupling hole provided in the center core 1a; a disc motor control circuit 3 which makes the motor 2 rotate at a prescribed rotary speed; a magnetic head 4 (hereinafter the reproducing head) which individually and selectively reproduces frequency modulated picture signals recorded in the recording tracks discretely arranged in a concentric manner on the recording surface of the disc 1; a bimorph electric-to-mechanical converting element 5 (hereinafter called the bimorph element) which carries the reproducing head 4 at its free end in such a way as to shift the head 4 in the direction of crossing the recording tracks on the disc 1; a head carriage 6 which has the other end of the element 5 secured thereto; a head shifting motor 7; and a screw shaft 7a which is arranged to be rotated by the motor 7 and has the head carriage 6 in screwed engagement therewith. The head carriage 6 is thus arranged to be moved in the direction of the arrow by virtue of the lead of the screw shaft 7a as the shaft 7a rotates. With the head carriage moved in this manner, the reproducing head 4 is shifted on the disc 1 from one recording track to another. A reference numeral 8 denotes a head shift control circuit which controls the shifting of the head's position by the motor 7 in response to a head the shift instruction.

The embodiment includes a reproduction amplification circuit 9 which amplifies a reproduced signal coming from the reproducing head 4; and an envelope detection circuit 10 which detects an envelope of a signal (RF signal) produced from the reproduction amplification circuit 9. The output of the envelope detection circuit 10 is supplied to a tracking control circuit 11, the positive input terminal of a comparison circuit 12 and a peak-to-peak detection circuit 13. The tracking control circuit 11 is arranged to control the bimorph element 5 in such a way as to accurately adjust the tracing position of the reproducing head 4 to the selected recording track of the disc 1 on the basis of the output of this detection circuit 10. The peak-to-peak detection circuit 13 is arranged to detect a difference level between the maximum and minimum levels of the signal detected by the envelope detection circuit 10. The output of the peak-to-peak detection circuit 13 is supplied to the negative input terminal of a comparison circuit 14. A reference potential V1 produced from a reference potential source 12a is supplied to the negative input terminal of the comparison circuit 12. Another reference potential V2 produced from a reference potential source 14a is supplied to the positive input terminal of the comparison circuit 14. The outputs of the comparison circuits 12 and 14 are supplied to an AND circuit 15. The output level of the AND circuit 15 becomes high when the output of the envelope detection circuit 10 is above the reference potential V1 and the output of the peak-to-peak detection circuit 13 is below the reference potential V2.

The signal (RF signal) produced from the reproduction amplification circuit 9 is demodulated at an ordinary FM demodulation circuit 16. The demodulated signal is then processed by a known signal processing circuit 17 into a standardized picture signal. Under a stable reproducing condition, the picture signal thus obtained is supplied to a display device 19 via the input terminal a and output terminal c of a switch circuit 18. This display device 19 may be an ordinary CRT (cathode ray tube). However, an LC (liquid crystal) or EL (electro-luminescence) display device is also usable as the display device 19.

In the case of the apparatus shown in FIG. 1, the display device 19 is arranged to have no signal supplied thereto under a condition in which the reproducing head 4 has not been firmly positioned for a specific recording track on the disc 1, such as a condition which obtains during the operation of automatic tracking correction means formed jointly by the elements 5-11. The reproduced picture signal is thus arranged to be supplied to the display device 19 only when the reproducing head 4 is correctly positioned relative to the recording track after completion of a tracking correction process or the like. More specifically, the output of the envelope detection circuit 10 is supplied to the comparison circuit 12 to be compared with the reference potential V1. If the level of the envelope detection output is higher than the reference potential V1, the reproducing head 4 is determined to have been correctly positioned relative to the recording track. The reproducing head 4 is determined not to have been correctly positioned when the envelope detection output is lower than the reference potential V1. To ensure a further accuracy of determination, the difference between the maximum and minimum levels of the envelope is compared with the reference potential V2 in addition to the above-stated comparison. For this purpose, the apparatus of FIG. 1 is provided with the detection circuit 13 which is arranged to make peak-to-peak detection of the envelope of the signal. The output of the detection circuit 13 is compared with the reference potential V2 at the comparison circuit 14. A condition in which the output level of the envelope detetion circuit 10 is above the reference potential V1 and that of the peak-to-peak detection circuit 13 below the reference potential V2 is arranged to be determined by a high output level of the AND circuit 15. When the output level of the AND circuit 15 becomes high, the position of the switch circuit 18 is shifted to the terminal a thereof to allow the reproduced picture signal to be supplied to the display device 19. If the output level of the AND circuit 15 is not high, the switch circuit 18 is shifted to a grounding terminal b to have no signal supplied to the display device 19.

The embodiment is thus arranged to inhibit any reproduced picture from being displayed before a reproducing operation on a selected recording track of the disc 1 becomes ready to display no disagreeably reproduced picture.

Figure 2:
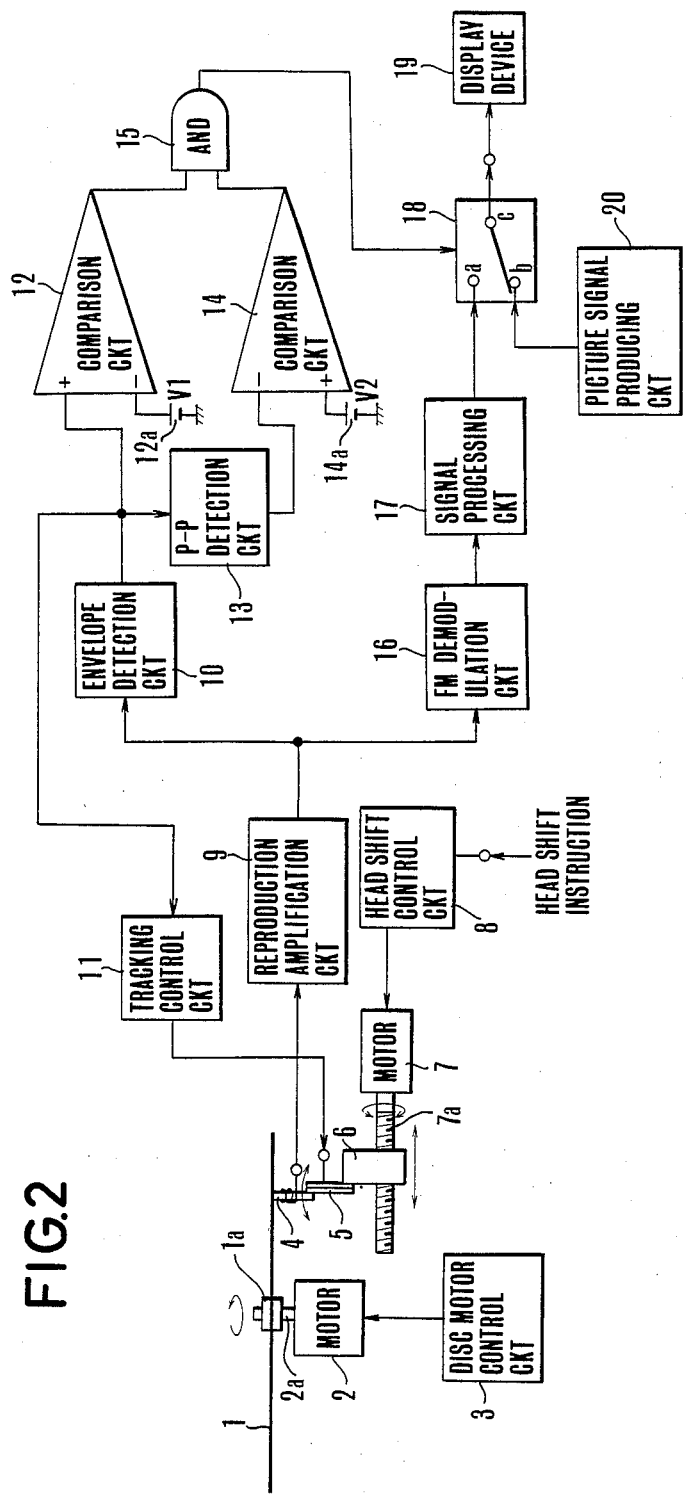
FIG. 2 is a block diagram showing a second embodiment example of the invention.

FIG. 2 shows a reproducing apparatus as a second embodiment of the invention. This embodiment is arranged to supply a specific picture signal to the display device until the reproducing head is correctly positioned relative to a selected recording track of the recording medium. In FIG. 2, the elements indicated by the same reference numerals as those used in FIG. 1 are of the same arrangement and functions as the corresponding elements shown in FIG. 1. Therefore, description of these same elements is omitted here. The second embodiment includes a picture signal producing circuit 20 which is arranged to produce the above-stated specific picture signal. The specific signal may be any signal that represents a specific pattern or picture. For example, the circuit 20 is arranged to produce a pattern signal such as a character signal representing words "please wait for a while" or "head in access process" prepared by means of a micro-computer, a character generator or the like. In this embodiment, the output of the signal processing circuit 17 is arranged to be supplied via the switch circuit 18 to the display device 19 only after the output level of the AND circuit 15 has become high. The signal produced from the picture signal producing circuit 20 is supplied to the display device to have the above-stated specific picture displayed there before the output level of the AND circuit 15 becomes high.

As described in the foregoing, the first embodiment (FIG. 1) is arranged to supply a reproduced picture signal to the display device only when the reproducing head is properly positioned for a desired recording track by a tracking correction operation or the like in shifting the reproducing head from one recording track to the desired recording track, so that the observer can be saved from having a disagreeable feeling due to an unstably reproduced picture.

In addition to the same advantage mentioned above, the second embodiment (FIG. 2) is arranged to give another advantage which resides in that a specific picture is displayed at the display device before the reproducing head is properly positioned for the recording track. This arrangement effectively prevents the interest of the observer in the picture to be displayed from fading away during the waiting period.

In accordance with the invented arrangement as shown in FIGS. 1 and 2, whether the reproducing head is correclty positioned for the desired recording track or not can be detected and the supply of a reproduced picture signal to the display device can be controlled accordingly with simple circuit arrangement.

Further, in the specific embodiment described, the invention is applied to a magnetic disc reproducing apparatus using a magnetic disc as recording medium. However, the invention is not limited to such application. The invention is applicable also to a magnetic drum reproducing apparatus adapted for use of a magnetic drum or to an optical disc reproducing apparatus using an optical disc. As regards the signals to be handled, the signal usable in accordance with the invention is not limited to a picture signal such as a TV signal but may be such a data signal that is used in a floppy disc device.

The advantageous effect of the present invention is also attainable in reproducing a still picture as seen in the case of a video cassette player. The applications of the invention is, therefore, not limited to reproducing apparatuses of the kind using a rotary recording medium.

The display device may be arranged either as a part of the reproducing apparatus or as a discrete device.

In the specific embodiments given in the foregoing, the automatic tracking means is used in positioning the reproducing head for a desired recording track. However, in accordance with the invention, any other means may be employed in place of the automatic tracking means for that purpose so far as the reproducing head can be correctly positioned relative to the desired recording track by such other means.

What we claim:

1. An apparatus for reproducing information from recording tracks of an information signal recording medium, comprising:
    (A) head means positionable for reproducing an information signal from a selected one of the recording tracks of said recording medium;
    (B) output means for supplying the information signals reproduced by said head means;
    (C) detecting means for detecting whether said head means is positioned properly relative to said selected track of the recording medium, said detecting means producing a characteristic indication when detecting that the head means is positioned properly relative to said selected track;
    (D) control means for enabling said output means to supply the information signal reproduced by said head means in response to said characteristic indication produced by said detecting means; and
    (E) memory means for memorizing a predetermined image information signal which represents a predetermined image and is produced otherwise than from said recording medium, said memory means supplying said image information signal when said information signal reproduced by said head means is not supplied by said output means.

2. The apparatus according to claim 1, wherein said detecting means includes circuit means for detecting, on the basis of the information signal reproduced through said head means, whether the head means is properly positioned relative to said selected track, said circuit means being arranged for producing said characteristic indication when detecting that the head means is properly positioned relative to the selected track.

3. The apparatus according to claim 2, further comprising:
    positioning means for positioning said head means relative to said selected track on the basis of the information signal reproduced through the head means.

4. An apparatus for reproducing information signals from circular recording tracks of a rotary type information signal recording medium, comprising:
    (A) rotating means for rotating said recording medium about an axis;
    (B) head means positionable for reproducing an information signal from a recording track of said recording medium;
    (C) positioning means for positioning said head means relative to a selected one of the recording tracks of said recording medium;
    (D) output means for supplying the information signal reproduced through said head means;
    (E) detecting means for detecting whether said head means is positioned properly relative to said selected track of the recording medium, said detecting means producing a characteristic indication when detecting that the head means is positioned properly relative to said selected track;
    (F) memory means for memorizing a predetermined image information which represents at least one field image;
    (G) selection means for selectively feeding a signal, which has been reproduced by said head means and fed, without passing through said memorizing means, or a signal, which has been reproduced by said head means and memorized by said memorizing means, to a monitor; and
    (H) control means for controlling a selection state of said selection means, in accordance with an output of said detection means.

5. The apparatus according to claim 4, further comprising:
    display means for displaying information in response to an output of said output means or an output of said memory means.

6. The apparatus according to claim 4, wherein said detecting means includes circuit means for detecting, on the basis of the information signal reproduced through said head means, whether the head means is properly positioned relative to said selected track, said circuit means producing said characteristic indication when detecting that the head means is properly positioned relative to the selected track.

7. The apparatus according to claim 6, wherein said positioning means includes means for adjusting the position of said head means relative to said selected track on the basis of the information signal reproduced through the head means.

8. The apparatus according to claim 4, further comprising:
   display means for displaying information in response to an output of said output means or an output of said memory means.

9. An apparatus for reproducing frequency modulated signals from recording tracks of a recording medium, comprising:
   (A) head means positionable for reproducing a frequency modulated signal from a selected one of the recording tracks of said recording medium;
   (B) signal processing means for processing the frequency modulated signal reproduced by said head means to produce a frequency demodulated signal;
   (C) output means for supplying the frequency demodulated signal produced by said signal processing means;
   (D) detecting means for detecting, on the basis of an envelope value of the frequency modulated signal reproduced by said head means, whether said head means is properly positioned relative to said selected track of the recording medium, said detecting means producing a characteristic indication when detecting that the head means is properly positioned relative to said selected track;
   (E) memory means for memorizing a predetermined image information which represents at lease one field image
   (F) selection means for selectively feeding a signal, which has been reproduced by said head means and fed, without passing through said memorizing means, or a signal, which has been reproduced by said head means and memorized by said memorizing means, to a monitor; and
   (G) control means for controlling a selection state of said selection means, in accordance with an output of said detection means.

10. The apparatus according to claim 1 or 4 or 9, wherein said detecting means includes;
   an envelope value detecting circuit for detecting the envelope value of the frequency modulated signal reproduced through said head means; and
   a comparison circuit for comparing said detected envelope value with a predetermined reference value, said comparison circuit being arranged to producing said characteristic indication when the detected envelope value is above said reference value.

11. The apparatus according to claim 10, further comprising:
   positioning means for positioning said head means relative to said selected track.

12. The apparatus according to claim 11, wherein said positioning means includes, means for adjusting, on the basis of the envelope value detected by said envelope value detecting circuit in said detecting means, the position of said head means so that the head means is properly positioned relative to said selected track.

13. The apparatus according to claim 1 or 4 or 9, further comprising:
   positioning means for positioning said head means relative to said selected track.

14. The apparatus according to claim 13, wherein said positioning means includes means for adjusting, on the basis of the envelope value of the frequency modulated signal reproduced through said head means, the position of the head means so that the head means is properly positioned relative to said selected track.

15. The apparatus according to claim 9, further comprising:
   display means for displaying information in response to an output of said output means or an output of said memory means.

* * * * *